June 10, 1924.
B. CAMPBELL
TRANSMISSION GEARING
Filed March 12, 1924      3 Sheets—Sheet 1
1,496,921
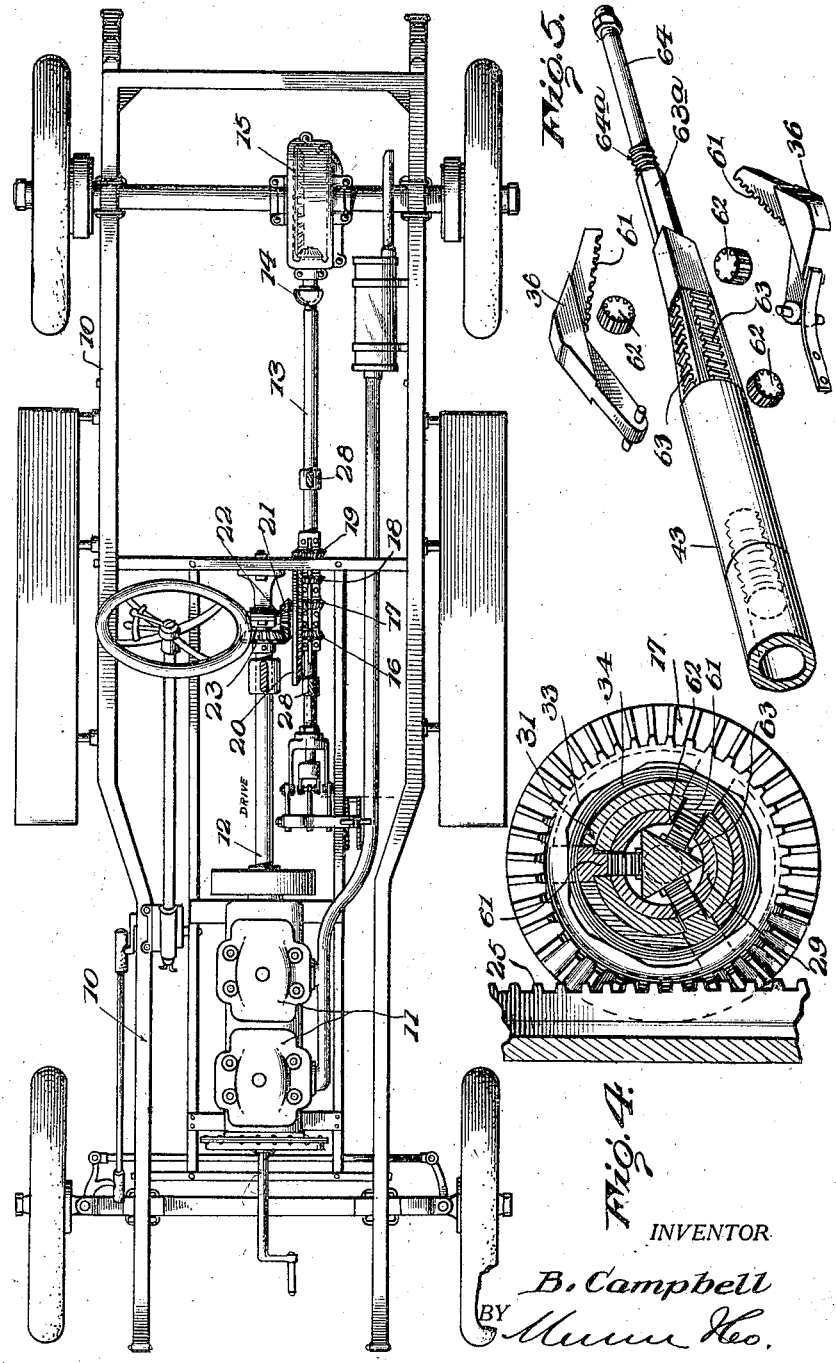
INVENTOR
B. Campbell
BY
ATTORNEYS

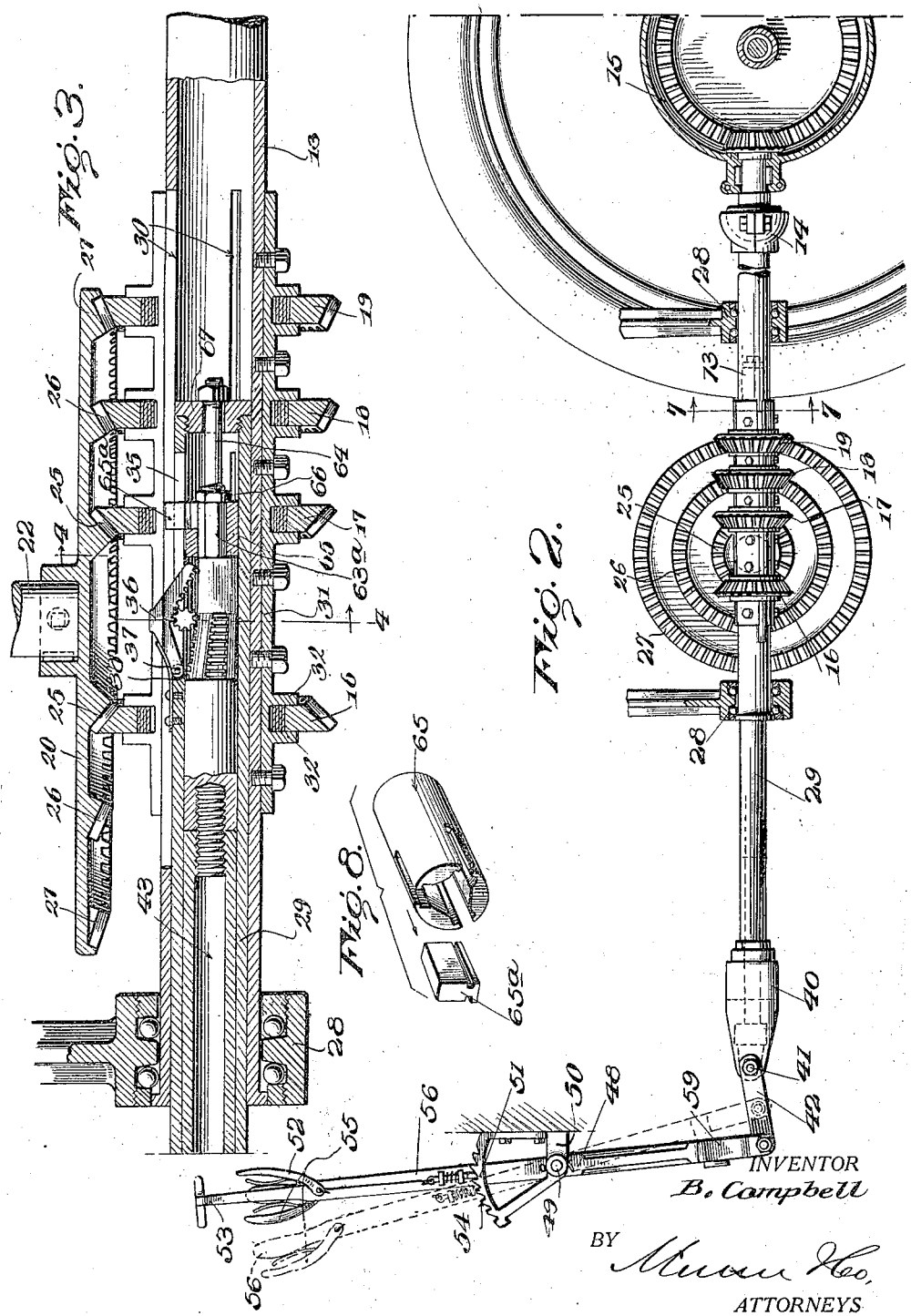

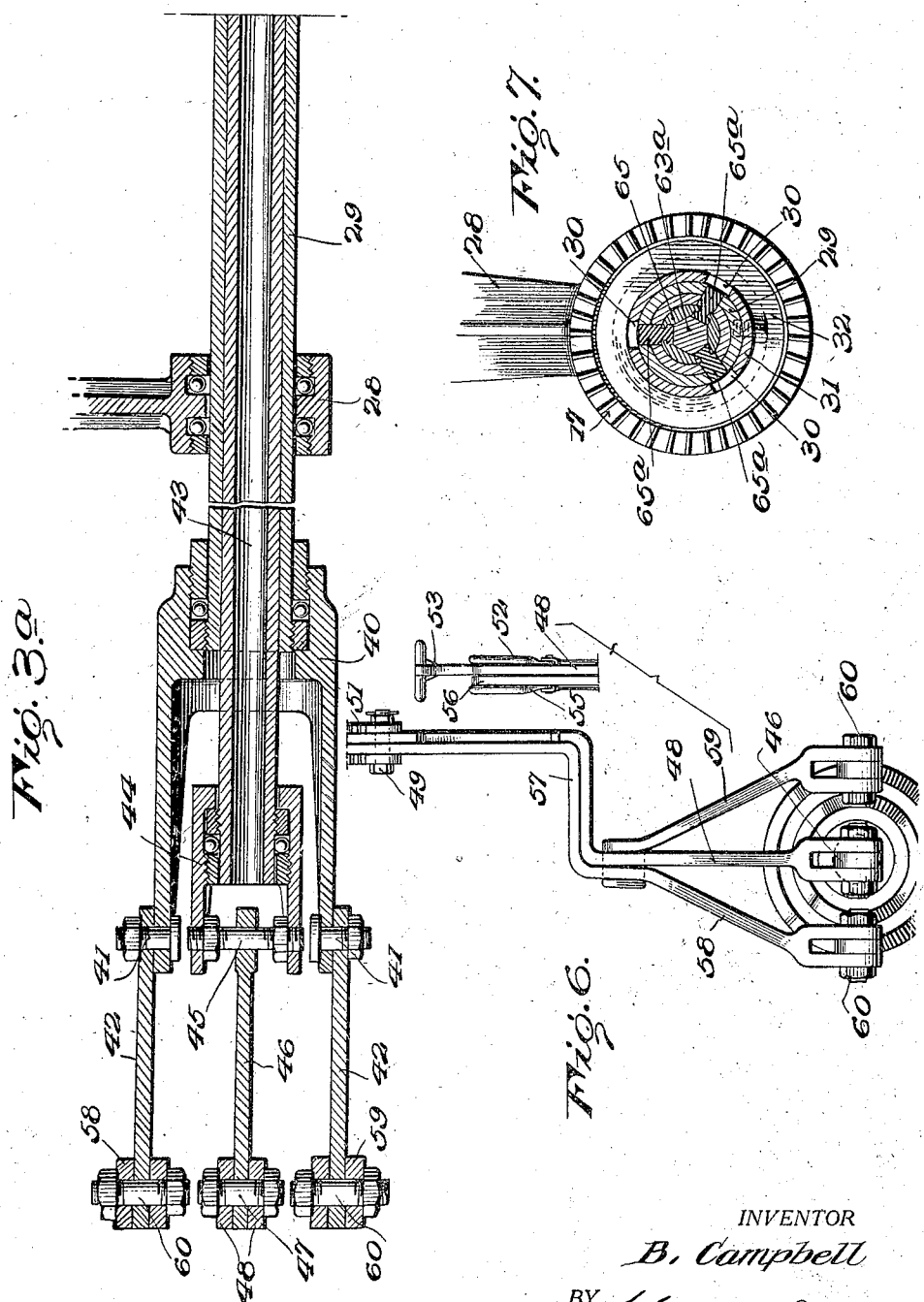

Patented June 10, 1924.

1,496,921

UNITED STATES PATENT OFFICE.

BERT CAMPBELL, OF MIAMI, FLORIDA.

TRANSMISSION GEARING.

Application filed March 12, 1924. Serial No. 698,793.

*To all whom it may concern:*

Be it known that I, BERT CAMPBELL, a citizen of the United States, and a resident of Miami, in the county of Dade and State of Florida, have invented certain new and useful Improvements in Transmission Gearing, of which the following is a specification.

My present invention relates generally to transmission gearing, and more particularly to a transmission gearing especially adapted to automobiles and motor cars with the object in mind of doing away with the necessity of a clutch as well as release of the clutch at each gear change operation required at the present time.

A further object is the provision of a transmission gearing which may be readily and easily housed, which is capable of operation with minimum wear, which is simple and inexpensive compared to transmission gearing now in general use, which may be easily manufactured and assembled, and which will be highly effective and efficient in use.

In the accompanying drawings which illustrate my present invention and form a part of this specification, Figure 1 is a plan view of the chassis of a motor vehicle illustrating the practical application of my improvements, Figure 2 is a sectional side elevation showing my improvements, Figure 3 is an enlarged horizontal section taken through the rear portion of the structure constituting my invention showing the gears themselves, Figure 3ª is a similar view showing the forward portion of my improvements and the control connections with the forward end of the clutch shifting tube and the clutch engaging and releasing rod, Figure 4 is an enlarged transverse sectional view taken substantially on line 4—4 of Figure 3, Figure 5 is a detail perspective view of the rear end portion of the clutch control rod, showing certain of the clutch members adjacent thereto, Figure 6 is an elevation looking rearwardly at the forward portions of the control levers, Figure 7 is a detail cross section taken substantially on line 7—7 of Figure 2, and, Figure 8 is a detail perspective view of the bearing block and one of its wings to be hereinafter referred to.

Referring now to these figures I have for purposes of illustration shown my invention in what is probably its widest application in connection with motor vehicles, the chassis 10 of such vehicle being seen generally in Figure 1, including a motor 11, rearwardly from which motor a crank shaft extends as at 12. According to my invention the propeller shaft 13, usually in connection with its rear portion through a universal 14 with a differential 15 between the rear axles, is offset with respect to the crank shaft and provided with a lengthwise series of spaced apart gears 16, 17, 18 and 19, all loose on the propeller shaft and in constant mesh with the gear rings of a driving disk 20, the latter of which may be driven in any suitable manner as for instance by mounting said disk upon a short transverse shaft 21 having thereon a bevel gear 22 in constant mesh with a bevel gear 23 upon the rear portion of the crank shaft 12. As best seen in Figure 3, the driving disk 20 has a series of ring gears 25, 26 and 27 in constant engagement with which the beforementioned propeller shaft gears 16, 17, 18 and 19 are disposed, the gears 16 and 17 being in mesh with the inner gear ring 25 at diametrically opposite points and the gears 18 and 19 being respectively in mesh with the central gear ring 26 and the outer gear ring 27 since the several gear rings 25, 26 and 27 are concentrically disposed.

The rear end of the propeller shaft 13 joins one part of the universal joint 14 beforementioned and the forward end of the propeller shaft may be supported in bearing members 28 so that it is free to receive in telescoping relation a clutch supporting and shifting tube 29 whose rear portion is movable longitudinally within the propeller shaft. Adjacent to the bearing member 28 at its forward end the propeller shaft has a series of lengthwise slots 30 and has upon its outer surface a series of gear holding strips 31 secured thereto between the slots 30, these gear holding strips 31 being provided at spaced points with outstanding lugs 32 upon opposite sides of the gears 16, 17, 18 and 19 as seen particularly by reference to Figures 2 and 3 so as to confine the gears loosely and rotatably in mesh with the gear rings 25, 26 and 27. It is to be noted at this point that each of the gears, of which the gear 17 appears in Figure 4, has an inner corrugated peripheral edge 33 of substantially greater diameter than that of the propeller shaft 13 and the gear holding strips 31 and that within each gear there are a series of flexible metallic clutch rings 34 normally loose around the gear holding strips 31.

The rear portion of the clutch carrying and shifting tube 29 is also slotted opposite the slots 30 of the propeller shaft, as indicated at 35, and at the forward ends of these slots 35 a series of angular clutch elements 36 are hingedly connected at 37, each clutch element being normally controlled by a spring 38 which holds the same in the inner inactive position with the intermediate portions of the clutch elements extending through the slots 35 of the clutch adjusting tube 29 and the slots 30 of the propeller shaft but inwardly beyond and without active engagement against the gears 16, 17, 18 and 19 and their inner clutch rings 34. Thus the tube 29 may, with the clutch parts in normal position, be shifted lengthwise of and within the propeller shaft until its clutch elements 36 are opposite any selected gear of the series of gears 16, 17, 18 and 19.

From the forward end of the propeller shaft 13, the clutch carrying and adjusting tube 29 extends forwardly through the forward bearing member 28 with respect to which it is rotatable and lengthwise movable, its forward end being swivelled within a yoke member 40 shown particularly in Figure 3ª whose side portions are pivotally connected at 41 to the rear ends of a pair of forwardly projecting side links 42.

Through the clutch carrying and adjusting tube 29 is a clutch actuating rod 43, which may if desired be hollow as I have shown especially in Figures 3 and 3ª, and whose forward end projects beyond the forward end of the tube 29 and is swivelly connected to a yoke 44 within the yoke 40 and pivotally connected at 45 with a forwardly projecting link 46 disposed centrally between the beforementioned side links 42.

The link 46 just above mentioned is pivotally connected at its forward end as at 47 with the lower end of a clutch actuating lever 48, the latter in turn fulcrumed intermediate its ends as at 49 in connection with a quadrant 50 having a rack 51 at one side with which the latch mechanism 52 of lever 48, located below its upwardly extended T-shaped handle 53, cooperates. The quadrant 50 also has at its opposite side a rack 54 to cooperate with the latch mechanism 55 adjacent the handle 56 of a second upright lever 57 whose function is that of shifting or adjusting the clutch elements to the several gears 16 to 19 inclusive. The lever 57 has at its lower end an offset arm 58 and is connected to an oppositely offset arm 59, the lower ends of these arms 58 and 59 being pivotally connected at 60 to the forward ends of the beforementioned side links 42 so that it is thus obvious that since lever 57 is fulcrumed upon the same point 49 as the lever 48, the two levers upon simultaneous movement in either direction will serve to shift the clutch elements 36 within and opposite the selected gear of the series 16 to 19 inclusive. Upon adjustment and subsequent release of the levers, it is obvious lever 57 will be instantly locked by virtue of its latch mechanism 55 in cooperation with the quadrant rack 54 and that the handle end 53 of lever 48 will then be grasped and moved forwardly so that its lower end will through its connection to the central link 46 shift the clutch actuating rod 43 rearwardly for a purpose which will be presently described.

By reference to Figures 3 and 5 it will be noted that the inner surfaces of the rear portions of the clutch elements 36 have racks 61 engaged by small toothed wheels 62, these wheels being disposed in the slots 35 of the clutch shifting tube 29 between the several clutch elements 36 and the three rearwardly tapering racks 63 of the rear substantially triangular portion of the clutch actuating rod 43. Thus the toothed wheels 62 are engageable with the racks 61 of the clutch elements 36 and will upon rearward shifting movement of the clutch actuating rod 43, be caused to rotate and move rearwardly lengthwise of the clutch elements 36 so as to force the latter outwardly into effective engagement with one of the gears 16 to 19 inclusive with which the clutch elements have been previously alined.

Rearwardly of its generally triangular portion having the racks 63, the clutch actuating rod 43 has a polygonal portion 63ª extending through a bearing block 65 (see Figures 3 and 8) which is slidable within the rear portion of the clutch supporting and adjusting tube 29. This bearing block 65 is locked by a nut 66 upon the forward threaded portion 64ª of the rear cylindrical stem 64 and has grooves for the reception of radially outstanding lugs or wings 65ª which work in the slots 30 and 35. This rear cylindrical stem is slidable through a closure block 67 which is threaded into the extreme rear end of the tube 29.

It thus becomes obvious that with the motor 11 in operation the gear plate 20 and the several gears 16, 17, 18 and 19 will be in constant motion. Furthermore with the control levers 48 and 57 in the position shown in full lines in Figure 2, the several clutch elements 36, being opposite the axis of the gear plate 20, are in neutral position and the several gears 16 to 19 inclusive will thus be permitted to run freely since they are all loosely rotatable about the propeller shaft. If at the start it is desired to go forward it is simply necessary for the operator to grasp the upper handle ends of the two levers 48 and 57 and simultaneously shift the same forwardly until the latch mechanism 55 of lever 57 is released within the next forward notch at which time the clutch elements 36 will be positioned within the gear 17. The control lever 57 being thus locked, the operator continues forward movement of the upper end of the lever 48 and the clutch actuating rod 43 is thus shifted rearwardly within the tube 29 so that the clutch elements 36 are forced outwardly into their active positions in engagement with the gear 17 locking the latter in connection with the propeller shaft so that this propeller shaft will be rotated at a speed in proportion to the engaging gear 17 and gear ring 25. The next forward movement of the lever 57 to clutch the intermediate speed gear 18 necessitates that the operator first pull lever 48 rearwardly by its upper handle 53 until it is opposite the lever 57 thus permitting the clutch elements 36 to disengage from the gear 17 before shifting of the lever 57 to bring the clutch elements within and opposite the gear 18. The levers are then moved together and lever 57 is then permitted to lock on the quadrant 54 and, as before, movement of the lever 48 in a forward direction is continued to again shift the clutch elements 36 into active position, this time within and in connection with the intermediate speed gear 18. Continuing the forward movement the same operation is repeated in order to shift the clutch in connection with the high speed gear at 19 and with the parts in the position shown in Figure 2 if it is desired to go into reverse, the two levers 48 and 57 are first drawn rearwardly so as to position the clutch elements 36 within the reverse gear 16, after which lever 48 is shifted forwardly to expand the clutch elements into active position.

It is of course to be understood from the foregoing that while especially adapted to automobiles and other motor cars my invention may be employed with facility in connection with any mechanism involving a change speed gearing, especially where it is a consideration to do away with the use of a clutch of the nature of an automobile clutch and it is also apparent that while I have shown and described the mechanism as including three forward gears and one reverse gear, its extension may be readily effected to include additional forward gears as well as additional reverse gears.

My invention obviously permits movement of the parts from any speed or from a standstill to any other speed, forward or reverse without actual change of gears and thus without clashing or the present danger of chipping of gears.

My invention furthermore obviously permits of wide range of adjustment and rearrangement of parts to suit either the convenience of the operator or provide for more ready adaptation to various makes of automobiles and other motor cars.

I claim:

1. In a transmission gearing, a driving member consisting of a plate having a series of concentric gear rings, a tubular driven member having a series of lengthwise slots and gear supporting members extending there along between said slots, a series of gears around the driven member and loosely rotatable in said supports in engagement with the gear rings of the driving member, a hollow clutch shifting member telescoping within the driven member, a series of radially shiftable clutch elements carried thereby and movable with the clutch shifting member opposite the several gears, and a clutch actuating rod extending through the hollow clutch shifting member and movable lengthwise therewith and in respect thereto, said rod and said clutch elements having cooperating means to shift the clutch elements radially into active position when the rod is moved inwardly with respect to the clutch shifting member.

2. In a change speed gearing, a tubular driven member, a series of lengthwise spaced gears of similar size thereon including a pair of oppositely facing gears, a clutch adjusting tube slidable within said driven member, a series of spring controlled clutch elements carried by said tube and movable therewith within and opposite the several gears, said driven member having lengthwise slots permitting radial movement of the clutch elements into engagement with the said gears, a driving member having a series of concentric gear rings in constant mesh with the said gears and with one of which gear rings the said pair of oppositely facing gears are in engagement at diametrically opposite points, and a clutch actuating rod movable with and slidable within the clutch adjusting tube, having means cooperating with the said clutch elements to shift the latter radially into engagement with said gears.

3. In a change speed gearing, a tubular driven member, a series of lengthwise spaced gears of similar size thereon including a pair of oppositely facing gears, a clutch adjusting tube slidable within said driven member, a series of spring controlled clutch elements carried by said tube and movable therewith within and opposite the several gears, said driven member having lengthwise slots permitting radial movement of the clutch elements into engagement with the said gears, a driving member having a series of concentric gear rings in constant mesh with the said gears and with one of which gear rings the said pair of oppositely facing gears are in engagement at diametrically opposite points, and a clutch actuating rod movable with and slidable within the clutch adjusting tube, having means cooperating with the said clutch elements to shift the latter radially into engagement with said gears, said clutch adjusting tube and said clutch actuating rod extending beyond the tubular driven member and having independent manual controlling elements.

4. In a change speed gearing, a tubular driven member, a series of lengthwise spaced gears of similar size thereon including a pair of oppositely facing gears, a clutch adjusting tube slidable within said driven member, a series of spring controlled clutch elements carried by said tube and movable therewith within and opposite the several gears, said driven member having lengthwise slots permitting radial movement of the clutch elements into engagement with the said gears, a driving member having a series of concentric gear rings in constant mesh with the said gears and with one of which gear rings the said pair of oppositely facing gears are in engagement at diametrically opposite points, and a clutch actuating rod movable with and slidable within the clutch adjusting tube, having means cooperating with the said clutch elements to shift the latter radially into engagement with said gears, and independent control levers for the manual control of the clutch adjusting tube and the clutch actuating rod, having independent locking means.

BERT CAMPBELL.